United States Patent
Syed Mohamed et al.

(10) Patent No.: US 9,871,766 B2
(45) Date of Patent: Jan. 16, 2018

(54) SECURE PATH DETERMINATION BETWEEN DEVICES

(71) Applicant: Hewlett-Packard Development Company, L.P., Houston, TX (US)

(72) Inventors: Parvez Syed Mohamed, Roseville, CA (US); Craig J. Mills, Roseville, CA (US); Shaun Wakumoto, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/777,465

(22) PCT Filed: Mar. 15, 2013

(86) PCT No.: PCT/US2013/032418
§ 371 (c)(1),
(2) Date: Sep. 15, 2015

(87) PCT Pub. No.: WO2014/143025
PCT Pub. Date: Sep. 18, 2014

(65) Prior Publication Data
US 2016/0043996 A1    Feb. 11, 2016

(51) Int. Cl.
*H04L 29/06* (2006.01)
*H04L 12/721* (2013.01)
*H04L 29/08* (2006.01)

(52) U.S. Cl.
CPC ........ *H04L 63/0263* (2013.01); *H04L 45/127* (2013.01); *H04L 63/04* (2013.01); *H04L 63/0485* (2013.01); *H04L 63/0876* (2013.01); *H04L 63/101* (2013.01); *H04L 63/162* (2013.01); *H04L 63/20* (2013.01); *H04L 67/322* (2013.01)

(58) Field of Classification Search
None
See application file for complete search history.

(56) References Cited

U.S. PATENT DOCUMENTS

| 7,729,276 B2 | 6/2010 | Akyol |
| 7,853,691 B2 | 12/2010 | Elzur et al. |
| 8,880,869 B1 * | 11/2014 | Shah ............... H04L 63/162 713/151 |
| 2004/0095944 A1 | 5/2004 | Mitchell |

(Continued)

OTHER PUBLICATIONS

"Chapter 12,: Configuring MACsec Encryption," Understanding Media Access Control Security and MACsec Key Agreement, 2012, pp. 1-16, Cisco Systems, Inc.

(Continued)

*Primary Examiner* — Kaveh Abrishamkar
(74) *Attorney, Agent, or Firm* — Hewlett Packard Enterprise Patent Department

(57) ABSTRACT

Methods, network controllers, and machine-readable and executable instructions are provided to determine a secure path between a source device and a destination device. The secure path may be via a plurality of network devices. The secure path may be determined based on a security capability of each of the plurality of network devices in the secure path. Data may be forwarded between the source device and the destination device, via the plurality of network devices, based on the determined path.

18 Claims, 9 Drawing Sheets

(56) References Cited

U.S. PATENT DOCUMENTS

| | | |
|---|---|---|
| 2005/0198691 A1 | 9/2005 | Ziang et al. |
| 2008/0092224 A1* | 4/2008 | Coulas .................... H04L 45/00 726/12 |
| 2008/0126559 A1* | 5/2008 | Elzur ................. H04L 63/0464 709/232 |
| 2009/0210707 A1* | 8/2009 | De Lutiis ............. H04L 63/123 713/170 |
| 2009/0217032 A1 | 8/2009 | Guan |
| 2009/0238196 A1* | 9/2009 | Ukita ................. H04L 12/5695 370/408 |
| 2011/0035580 A1 | 2/2011 | Wang et al. |
| 2011/0087878 A1* | 4/2011 | Weis ..................... H04L 63/102 713/151 |
| 2011/0231654 A1* | 9/2011 | Somadder ........... H04L 12/5691 713/153 |
| 2012/0044949 A1 | 2/2012 | Velev et al. |
| 2013/0091349 A1* | 4/2013 | Chopra .................. H04L 45/50 713/150 |
| 2013/0318570 A1* | 11/2013 | L ............................ H04L 63/20 726/4 |
| 2014/0201516 A1* | 7/2014 | Bjarnason ............... H04L 45/64 713/150 |

OTHER PUBLICATIONS

International Search Report and Written Opinion, International Application No. PCT/US2013/032418, dated Dec. 26, 2013, pp. 1-10.

\* cited by examiner

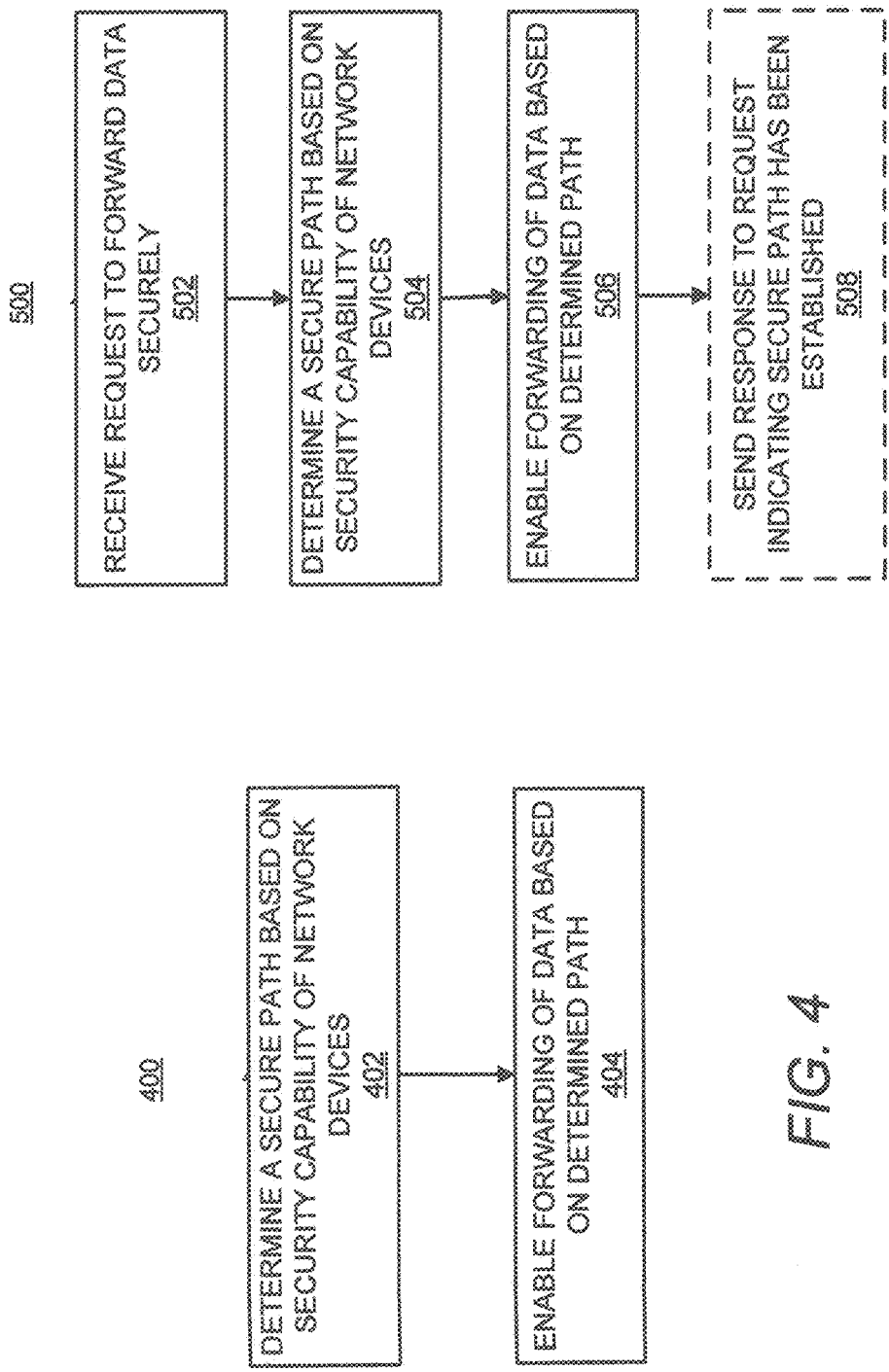

SECURE PATH DETERMINATION BETWEEN DEVICES

BACKGROUND

Data networks route data traffic via a collection of network devices that take the form of, for example, routers, hubs and switches. Very large networks may involve hundreds or even thousands of network devices. To transfer data within networks, individual network devices often coordinate via network protocols such as the Spanning Tree Protocol (STP) and the like, to route data along paths between network devices. This transfer of data may be negotiated via STP based on efficiency of paths within networks.

BRIEF DESCRIPTION OF THE DRAWINGS

Features of the present disclosure are illustrated by way of example and not limited in the following figure(s), in which:

FIG. 4 depicts an example diagram of a process, performed by a controller, for determining a secure path between two client devices, according to one or more examples of the present disclosure;

FIG. 5 depicts an example flow diagram of a process, performed by a controller, for determining a secure path between two client devices, according to one or more examples of the present disclosure;

DETAILED DESCRIPTION

Figure 1:
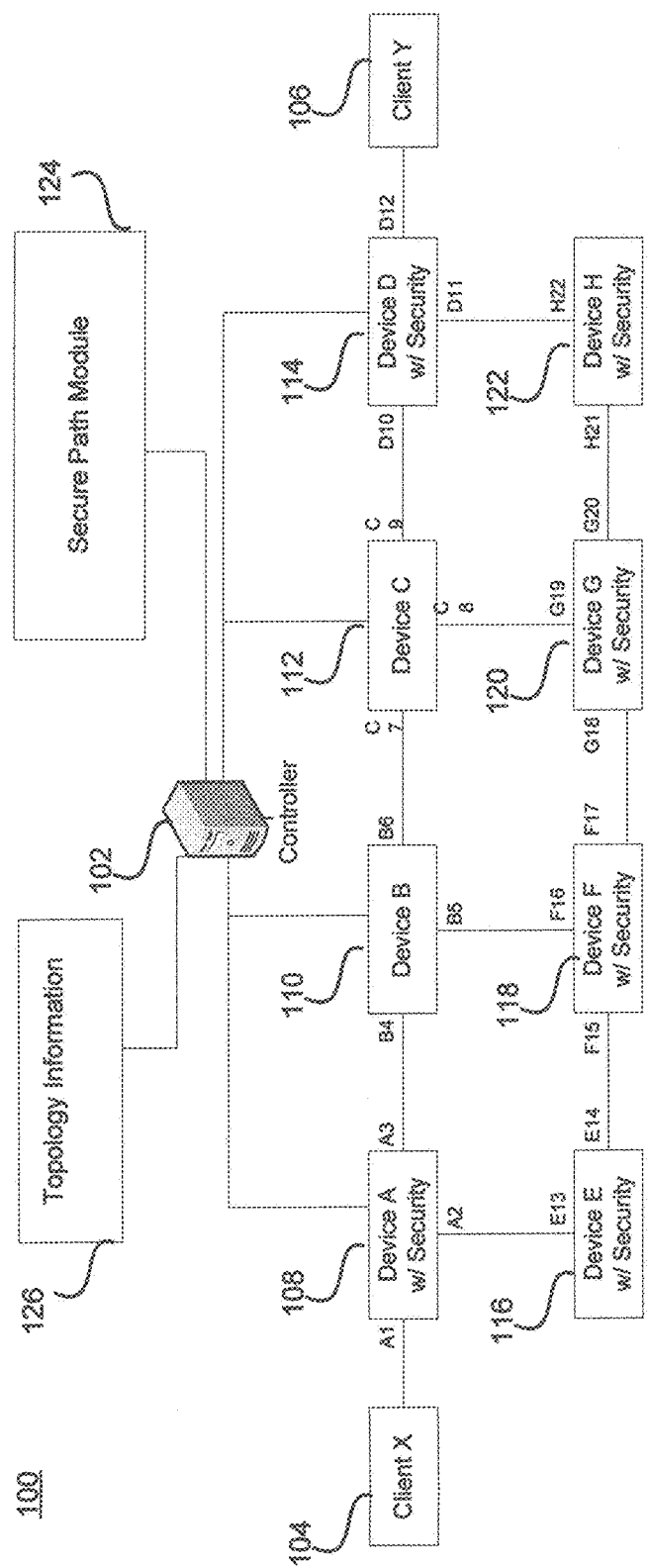
FIG. 1 depicts an example system environment, according to one or more examples of the present disclosure.

Software defined networking (SDN) is a form of network virtualization in which the control plane is separated from the data plane and implemented in a software application. Network administrators can therefore have programmable central control of network traffic at a controller without requiring physical access to the network's hardware devices. One example of a protocol for SDN is Open Flow, which is a communications protocol that gives access to the forwarding plane of a network switch over the network. Some examples of the present disclosure can operate according to an OpenFlow, or other SDN protocols, and/or a hybrid of an SDN protocol combined with "normal" networking.

Within the context of a non-SDN network, paths may be negotiated, where end-to-end secure communication may be established using security protocols, for example, internet protocol security (IPsec).

IPsec is an end-to-end encryption channel which can be used for individual communication flows or entire network talking to a different network. IPsec can be performed in either software or hardware. IPsec hardware acceleration may be provided on high-end routers, branch office devices, and dedicated VPNs. IPsec generally may not be provided found on basic networking devices (e.g. layer 2 switches, low-end routers).

Media access control security (MACsec), 802.1AE, Institute of Electrical and Electronics Engineers (IEEE) standard, can include a defined frame format, which can be similar to an Ethernet frame with additional fields such as a security tag (e.g., an extension of the Ethertype) and message authentication code. The security tag in each MACsec frame can include an association number within the channel, a packet number to provide a unique initialization vector for encryption and authentication algorithms as well as protection against replay attack. MACsec can utilize secure connectivity associations that represent groups of stations connected via unidirectional secure channels. Security associations within each secured channel use their own encryption/decryption keys. MACsec may be used between switches on a Layer 2 network and may not be appropriate for communication across a Layer 3 network (e.g., across routers). MACsec enables port to port hardware encryption such that the network packets are securely encrypted between networking devices. MACsec packets are decrypted at every MACsec capable network device, its packets studied and acted upon for appropriate QoS requirements, or other traffic policies, for example, access control lists (ACL's, rate limits, etc., and again encrypted before passing on to the next MACsec capable device.

Different protocols may be preferred depending on the circumstance. For example, using MACsec, administrators can apply policies based on packet headers and payloads since every device participating in MACsec will see the actual packet. IPsec, on the other hand, is a tunneling protocol as well as an end-to-end encryption scheme and no device along that path sees the original packet header or payload. The quality of service (QoS) of IPsec traffic is generally based on the packet header contents which are encrypted when using IPsec.

Within a SDN, a controller may have knowledge of the topology of a system environment. Thus, a controller may select a path based on its knowledge of abilities, for example, security capability, of network devices within the system environment.

Where a source device wishes to send data to a destination device securely, the controller may determine a secure path through the system environment based on security capability of the network devices in the system environment. Once a path is determined, the controller may enable the secure path such that the source device may securely forward data to the destination device.

As the controller has control over the devices within the secure path, QoS settings may be applied at each device in the path.

FIG. 1 is a diagram illustrating an example of a system environment 100 according to the present disclosure. The network 100 can include a network controller 102 (e.g., a software-defined networking (SDN) network controller). SDN is a form of network virtualization in which the control plane is separated from the data plane and implemented in a software application. Network administrators can therefore have programmable central control of network traffic without requiring physical access to the network's hardware devices. One example of a protocol for SDN is OpenFlow, which is a communications protocol that gives programmable access to the forwarding plane of a network switch over the network. Some examples of the present disclosure can operate according to an OpenFlow, or other SDN protocols, and/or a hybrid of an SDN protocol combined with "normal" networking.

The network controller 102 may be in communication with and/or have control over network devices 108, 110, 112, 114, 116, 118, 120 and 122. Network devices 108, 110, 112, 114, 116, 118, 120 and 122 may be implemented as, for example, switches, routers, or other network devices. Network devices 108, 114, 116, 118, 120 and 122 may be implemented as network devices having a security capability. A security capability may be implemented as, for example, one or more of media access control security (MACsec), MACsec pass-through, internet protocol security (IPsec), etc. MACsec and IPsec are discussed above. MACsec pass-through is discussed with regard to FIG. 7 below. Network devices 108, 114, 116, 118, 120 and 122, while having the security capability, may or may not have the security capability enabled. Network devices 108, 110, 112, 114, 116, 118, 120 and 122 may be communicably linked to controller 102. In addition, network devices 108, 114, 116, 118, 120 and 122 may be communicably linked to each other, as indicated in FIG. 1. System 100 may be implemented as one or more networks, including local area network (LAN), wide area network (WAN), personal area network (PAN), the Internet, etc.

System environment may further include client X device 104 and client Y device 106. Client X device 104 and client Y device 106 may be communicably linked to controller 102 via network devices 108 and 114, respectively. Client X device 104 and client Y device 106 may be implemented as end user client computing devices, for example, personal computing devices, laptop computing devices, desktop computing devices, handheld computing devices, etc. For examples discussed herein, client X device 104 may be implemented as a source device and client Y device 106 may be implemented as a destination device, where client X 104 may send data to client Y 106.

It may be appreciated that the example depicted in FIG. 1, and the other figures discussed herein, are not limited to the specific number of network devices illustrated in the system environment 100.

Controller 102 may be in communication with and/or have control over network devices 108, 110, 112, 114, 116, 118, 120 and 122. Controller 102 may include secure path module 124. Secure path module 124 may determine a secure path between client X 104 and client Y 106, as more fully discussed herein.

It may be appreciated that, while one or more examples discussed herein provide for the secure path module 124 to be at controller 102, the secure path module 124 may be on another platform where actions may be sent to the controller to disseminate to one or more network devices win system environment 100. This layer of abstraction may be useful in scaling the number of computing resources utilized by the application separately from the resources utilized to communicate with the network infrastructure.

Controller 102 may further manage topology information 126. Topology information 126 may store information associated with network devices 108, 110, 112, 114, 116, 118, 120 and 122 and network topology. Topology information 126 is more fully discussed below.

It may be appreciated that MACsec is an OSI layer 2 feature (datalink layer) and MACsec hardware is capable of assigning security associations based on layer 2 (ethernet) packet headers. The standard may be defined this way, but administrators typically view the world using layer 3 (IP addresses) and layer 4 (transmission control protocol and user datagram protocol (TCP/UDP) port numbers) information. With this being the case, examples as discussed herein introduce the idea of extending the MACsec hardware filtering capabilities and allows administrators to assign security associations between two neighboring devices using layer 2-4 header information.

Figure 2:
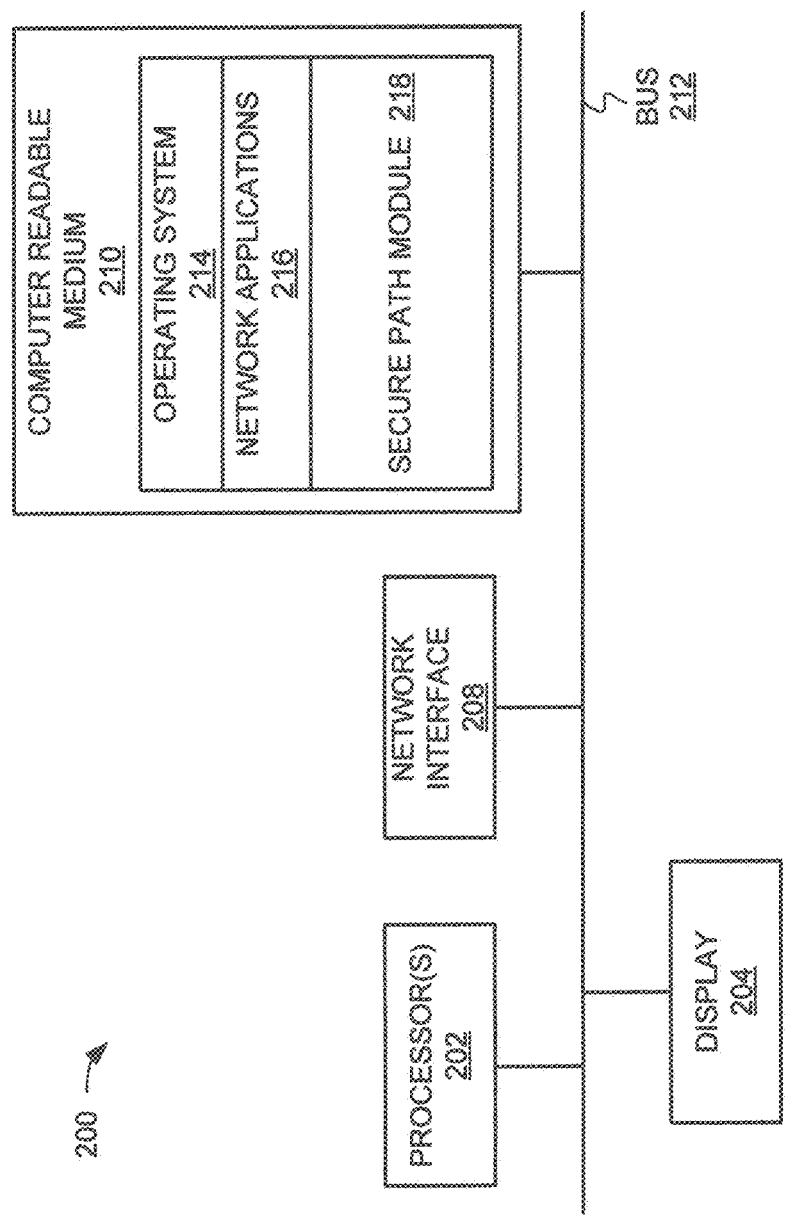
FIG. 2 depicts a schematic representation of a controlling device, to one or more examples of the present disclosure.

FIG. 2 depicts a schematic representation of a controlling device 200, which may be employed to perform various functions of the controller 102 depicted in FIG. 1, according to one or more examples. Controller 102 includes a processor 202; a display device 204, such as a monitor; a network interface 208, such as a Local Area Network LAN, a wireless 802.11x LAN, a 3G mobile WAN or a WiMax WAN; and a computer-readable medium 210. Each of these components is operatively coupled to a bus 212. For example, the bus 212 may be an EISA, a PCI, a USB, a FireWire, a NuBus, or a PDS.

The computer readable medium 210 may be any suitable non-transitory medium that participates in providing instructions to the processor 202 for execution. For example, the computer readable medium 210 may be non-volatile media, such as an optical or a magnetic disk; volatile media, such as memory; and transmission media, such as coaxial cables, copper wire, and fiber optics. Transmission media can also take the form of acoustic, light, or radio frequency waves.

The computer-readable medium 210 may also store an operating system 214, such as Mac OS, MS Windows, Unix, Linux, etc.; network applications 216 to facilitate communication with network devices 108, 110, 112, 114, 116, 118, 120 and 122; and a secure path module 218. The operating system 214 may be multi-user, multiprocessing, multitasking, multithreading, real-time and the like. The network applications 216 include various components for establishing and maintaining network connections, such as machine-readable instructions for implementing communication protocols including TCP/IP, HTTP, Ethernet, USB, and FireWire.

The secure path module 218 provides various components for determining and enabling a secure path between two client devices, as described herein. In certain examples, the processes may be at least partially implemented in digital electronic circuitry, or in computer hardware, machine-readable instructions (including firmware and/or software), or in any combination thereof.

Figure 3:
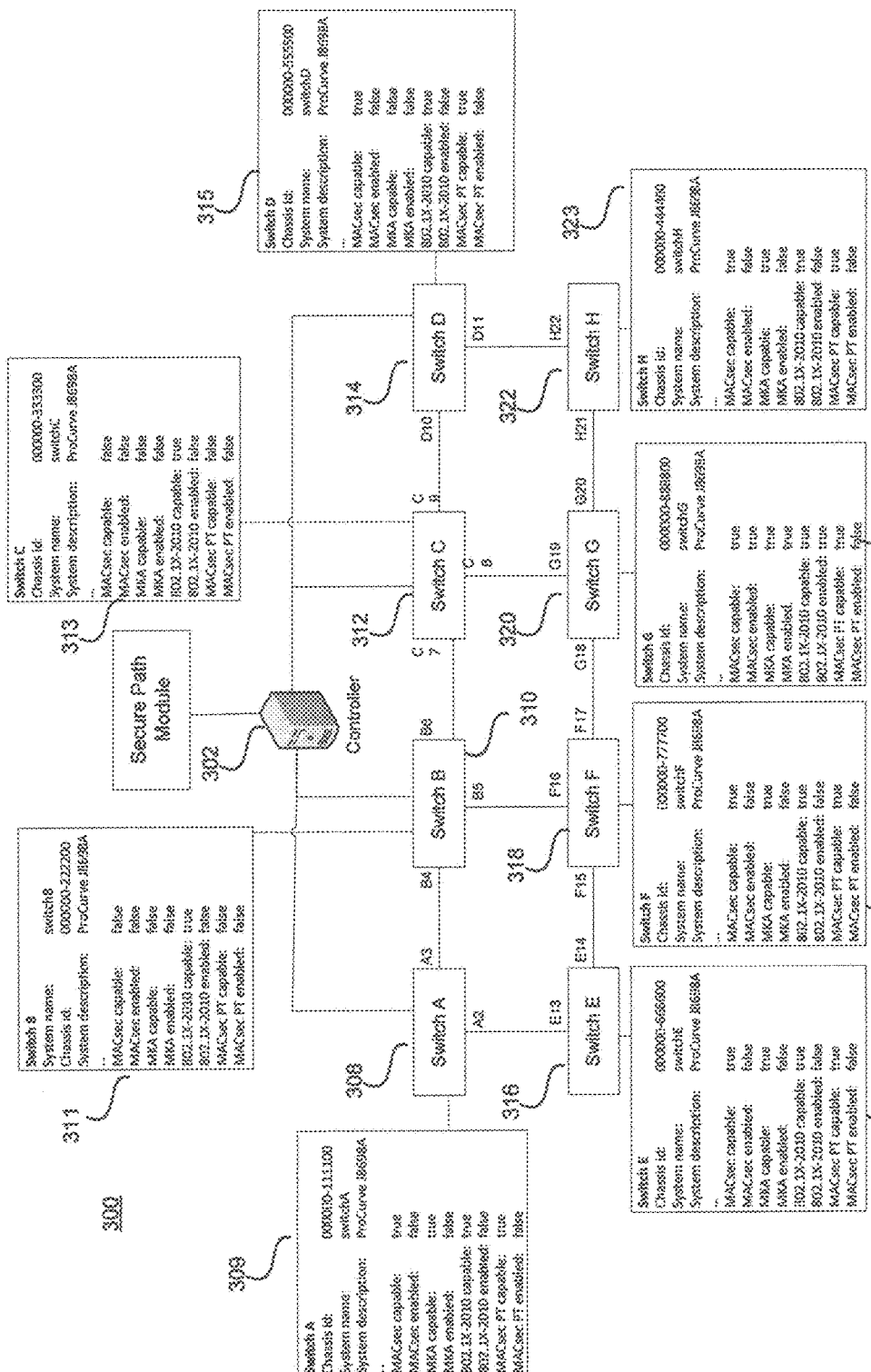
FIG. 3 depicts an example network topology, according to one or more examples of the present disclosure.

FIG. 3 depicts an example schematic representation of a topology of a network. The information depicted in FIG. 3 may be stored in a memory and accessible by controller 302. The topology information may be stored in a memory such as a database, one or more tables, etc. The network topology information may be stored at controller 302 or may be stored separate from controller 302 where controller 302 may be communicably linked to the memory. Topology information may include information associated with network devices within system environment 300 and information regarding the communication links in the system environment, including which network devices are communicably linked and via which ports, etc.

As can be seen in FIG. 3, a system environment 300 is depicted including controller 302, network devices 308, 310, 312, 314, 316, 318, 320 and 322. Indications of communication links are indicated in the figure. For example, switch 308 is communicably linked to switch 310 and switch 316. In addition, information associated with each of the network devices is provided. For example, network devices 308, 310, 312, 314, 316, 318, 320 and 322 have associated therewith network device information 309, 311, 313, 315, 317, 319, 321, and 323. Network device information may include information regarding the network device including device identifying information, security capability of the network device, whether security features are enabled, etc. It may be appreciated that additional information may be stored as topology information.

Although switches are implemented as the network devices 308, 310, 312, 314, 316, 318, 320 and 322, it may be appreciated the network devices 308, 310, 312, 314, 316, 318, 320 and 322 may be implemented as other network devices. In addition, one or more networks may be implemented within system environment 300.

FIG. 4 depicts an example diagram of a process 400, performed by a controller, for determining a secure path between two client devices. FIG. 4 may be discussed utilizing devices in FIG. 1 for explanation purposes.

As shown in FIG. 4, the controller may determine a secure path based on a secure capability of network devices (402).

The controller 102 may identify a secure path between client devices, for example, between a source device 104, the source device sending the data, and a destination device 106, the destination device receiving the data, by utilizing topology information 126. Controller 102 may use OpenFlow rules, route table changes, and/or policy based routing (PBR) to determine a secure path between the source and destination devices, via a plurality of network devices. In utilizing OpenFlow rules, route table changes, and/or PBR, controller 102 may consider links in the system environment 100, in conjunction with security capability of network devices 108, 110, 112, 114, 116, 118, 120 and 122 in order to determine a secure path.

Once a secure path is determined, the controller enables forwarding of data based on the determined path 404. The controller may enable forwarding of data between the source device and destination device, via a plurality of network devices in the system environment, by determining whether the security capability is enabled at each of the network devices. If one or more of the plurality of network devices in the secure path do not have the security capability enabled, the controller 102 may enable the security feature at the one or more network devices. Additionally, or alternatively, the controller may enable forwarding of data between the source device and destination device, via a plurality of network devices in the system environment, by notifying the source device that a secure path has been determined.

FIG. 5 depicts an example diagram of a process 500, performed by a controller, for determining a secure path between two client devices. FIG. 5 may be discussed utilizing devices in FIG. 1 for explanation purposes.

As shown in FIG. 5, a request may be received to forward data securely 502. The request may be sent to the controller from the source device 104, from a network device 108, etc. In response to the request, the controller may determine a secure path based on a secure capability of network devices 504. The secure path may be determined as discussed with regard to FIG. 4.

Once a secure path is determined, the controller enables forwarding of data based on the determined path 506. The controller may enable forwarding of data between the source device and destination device, via a plurality of network devices in the system environment, by determining whether the security capability is enabled at each of the network devices. If one or more of the plurality of network devices in the secure path do not have the security capability enabled, the controller 102 may enable the security feature at the one or more network devices. The controller 102 may then, optionally, send a response to the received request indicating that a secure path has been established 508.

Figure 6:
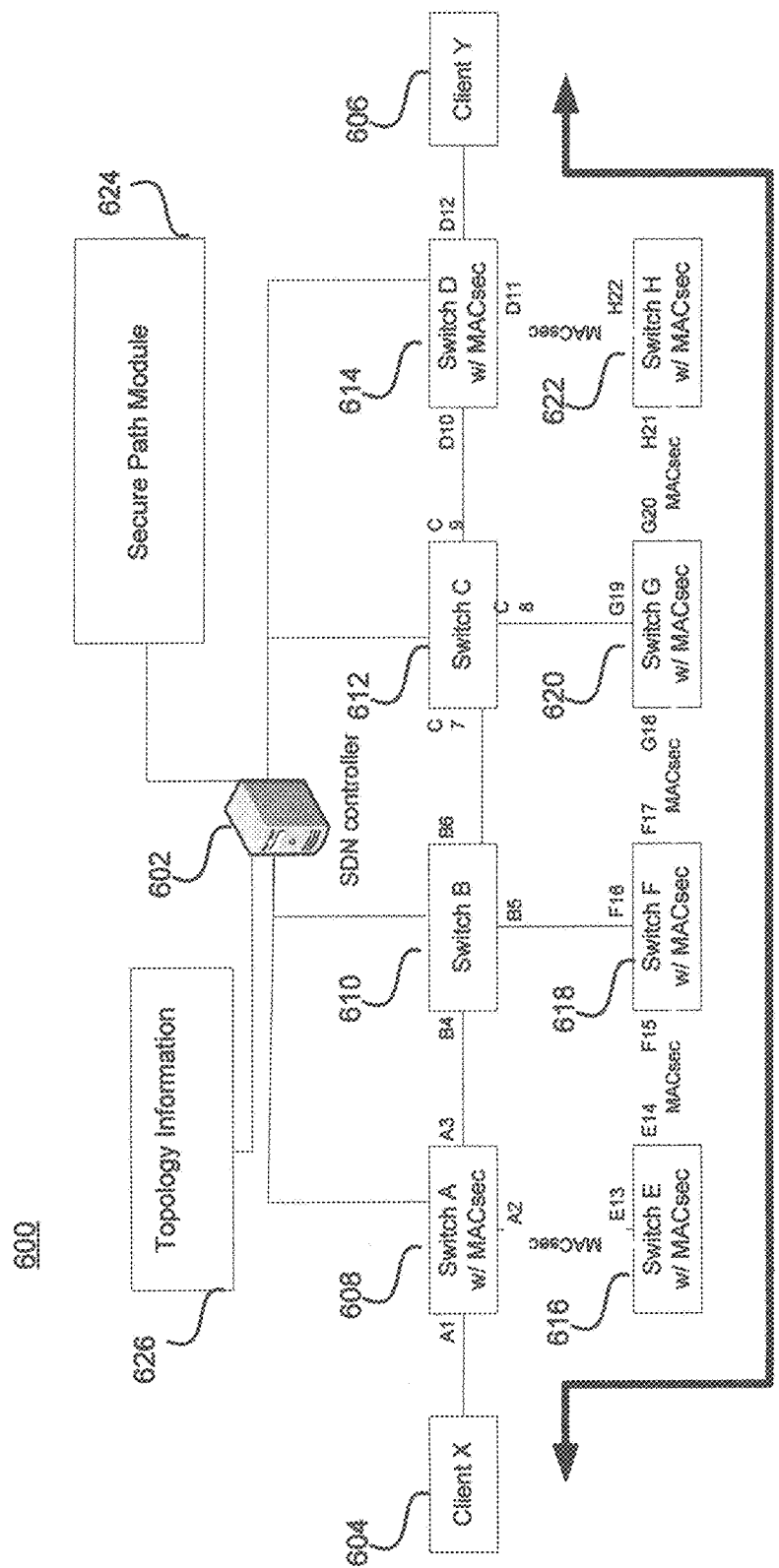
FIG. 6 depicts an example system environment with a secure path determined, according to one or more examples of the present disclosure.

FIG. 6 depicts a diagram illustrating an example of a system environment 600 according to the present disclosure. The devices in FIG. 6 depict a specific implementation wherein network devices 108, 110, 112, 114, 116, 118, 120 and 122 are implemented as switches 608, 610, 612, 614, 616, 618, 620 and 622, respectively, with some of the switches, as shown, have a security capability, namely MACsec.

In a typical forwarding path, where client X 604, as the source device wants to forward data to client Y 606, as the destination device, controller 604 may determine a path including client X 604→switch A 608→switch B 610→switch C 612→switch D 614→client Y 606. However, this path may not provide a secure path to protect the data.

As the controller 602 has knowledge about the topology of the system environment 600, as discussed above, controller 602 may determine a secure path through network devices that have a security capability. The arrow depicted in FIG. 6 identifies the determined secure path as follows: client X 604→switch A 608→switch E 616→switch F 618→switch G 620→switch H 622→switch D 614→client Y 606. As can be seen in FIG. 6, the secure path provides MACsec security between each of the switches in the secure path.

As an alternative example to FIG. 6, it may be appreciated that different security capabilities may be employed at different network devices in system environment 600. For example, instead of switch F 618 in system environment 600 having MACsec as a security capability, switch F 618 may have a MACsec pass-through capability. IPsec can also be used to build a secure path between two devices when a MACsec path cannot be found. This can be either because an intermediary device does not support MACsec pass-through, if the current MACsec path is over saturated, etc. One of the roles of the controller may be network monitoring so it can easily find optimal paths based on hop count, current utilization, etc. Thus, if a particular link is over-subscribed, an alternative secure path may be determined.

Figure 7:
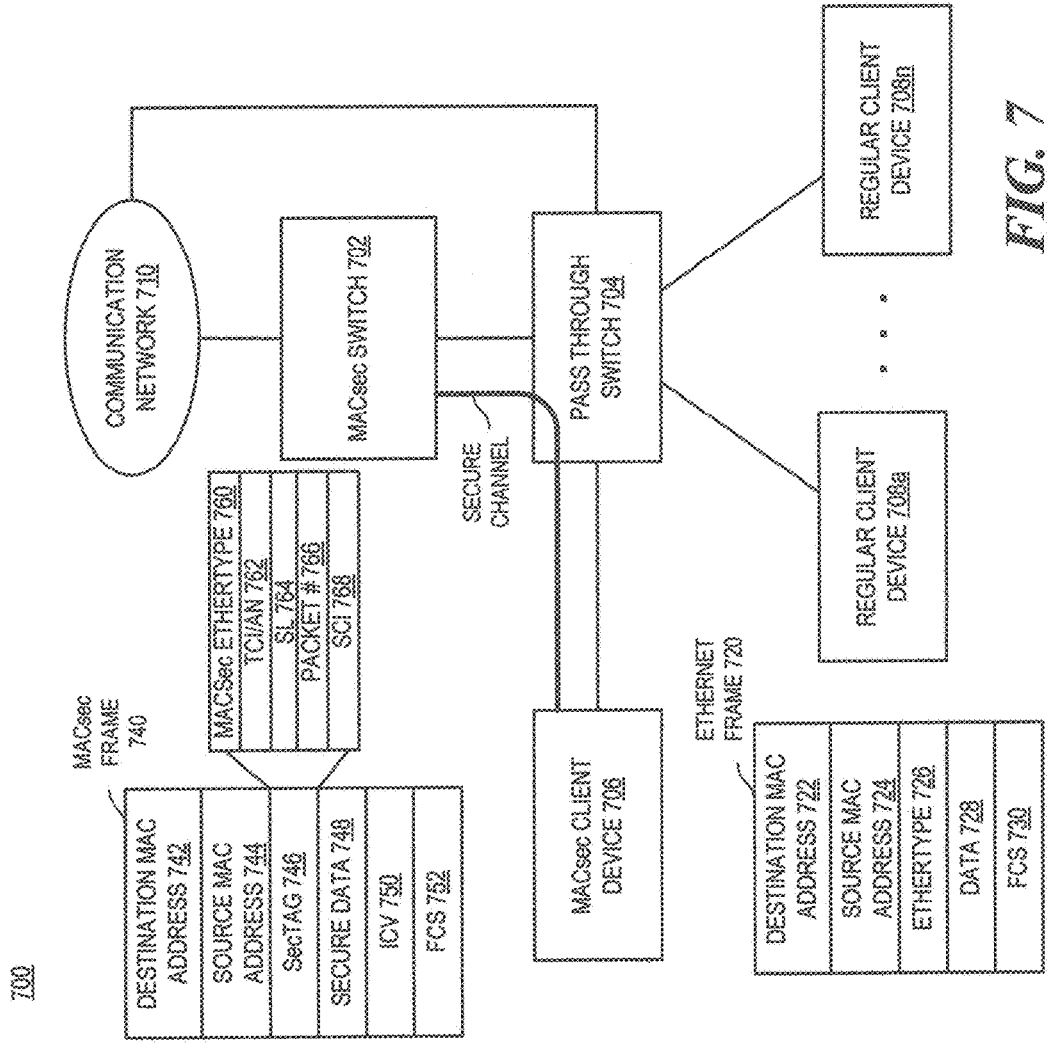
FIG. 7 is a block diagram of a system including a MACsec pass through switch capable of passing frames based on an Ethertype, according to one or more examples of the present disclosure.

FIG. 7 is a block diagram of a system including a MACsec pass through switch capable of passing frames based on an Ethertype, according to at least one example. The system 700 can include a MACsec Switch 702, a pass through switch 704, a MACsec client device 706 or multiple MACsec client devices, one or more regular client devices 708a-708n, and/or other devices connected via a communication network 710. In certain examples, the MACsec client device 706, the regular client devices 708a-708n, or other devices connected via the communication network 710 are computing devices, such as servers, client computers, desktop computers, mobile computers, etc. Further, in certain embodiments, the MACsec switch 702, the pass through switch 704, the MACsec client device 706, and the regular client devices 708 can be implemented, at least in part, via a processing element, memory, and/or other components.

In one example, client devices such as the MACsec client device 706 and/or regular client device 708 can use a standard Ethernet frame, such as Ethernet frame 720, as a packet to communicate to other devices. Ethernet frame 720 includes a destination MAC address 722 that describes the MAC address of the intended recipient, a source MAC address 724 that describes the MAC address of the sender of the Ethernet frame 720, an Ethertype 726, payload data 728, and a frame check sequence (FCS) 730 that can be used for error detection. In certain scenarios, when connections are made between a regular client device 108 and another device via the pass through switch 704, the regular client device 708 can be authenticated, for example, at the access level, by the pass through switch 704.

Further, the MACsec client device 706 can use one or more types of frames to communicate with other devices, for example, a standard Ethernet frame 720 or a MACsec frame 740. The MACsec frame 740 can include a destination MAC address 742, a source MAC address 744, a security tag (SecTAG) 746, secure data 748 that includes encrypted data, an integrity check value (ICV) 750 that can be calculated based on the contents of the frame, and an FCS 752. The SecTAG 746 can include a MACsec Ethertype 760, tag control information/association number (TCI/AN) 762 including information that may be used to determine a version of the MACsec protocol to be used in the packet and may include information that can be used to transmit the frame over a secure channel, a short length (SL) 764 that can be used to determine the number of bytes of the secure data 748 that is between the last byte of the of the SecTAG 746 and the first byte of the ICV 750, a packet number 766, and a Secure Channel Identifier 768 that can be used to identify a source address and port that transmitted the frame. In this example, the MACsec Ethertype 760 is directly after the source MAC address 744. As such, the Ethertype is in the same location in the MACsec Frame 740 and the Ethernet Frame 720.

In one example, the MACsec client device 706 wishes to connect to another MACsec enabled device via the pass through switch 704. In this example, the communication can be processed via the MACsec switch 702. The MACsec client device 706 can perform 802.1X authentication with the MACsec switch 702 via the pass through switch 704. In this scenario, the pass through switch 704 receives one or more 802.1X frames from the MACsec client device 706 and parses the frames to determine that the frames should be passed through the pass through switch 704. The frames are not consumed by the pass through switch 704, which goes against the 802.1X specification. The decision to pass through the switch can be based on the Ethertype of the frame. In one scenario, an 802.1X protocol frame has the Ethertype of 0x888E. This Ethertype can be configured to be passed through the pass through switch 704 to another device. In certain scenarios, the MACsec switch 702 can be directly connected to the pass through switch 704 and can use the 802.1X frame. In other scenarios, multiple pass through switches can be connected between the MACsec devices. Each of the pass through switches can be configured to pass through 802.1X frames. An exchange can occur between the two MACsec compatible devices (e.g., the MACsec client device 706 and the MACsec switch 102) for the authentication. Each of the 802.1X frames to/from the MACsec compatible devices are passed through. As such, a secure association can be created between the MACsec compatible devices. This can be enabled by the pass through switch 104 and/or other pass through switches in between the MACsec compatible devices passing through the pass through switches.

Once the secure association is made, MACsec frames can be sent to/from the MACsec compatible devices. These frames can include secure data. The pass through switch 704 can parse frames received to determine the Ethertype. If the Ethertype indicates that the frame is a MACsec frame, for example, if the frame has an Ethertype of 0x88E5, the pass through switch 704 can pass the frame to the next device in the path between MACsec compatible devices. In one example, the next device is another pass through switch between the MACsec devices. In another example, the next device is a MACsec compatible device, such as MACsec client device 706 or MACsec switch 702. In certain embodiments, passing through the frames means that the frames are forwarded to the next device without alteration. In certain embodiments, without alternation means that the frame forwarded is the same, bit by bit, as the frame.

At this stage, in certain examples, the pass through switch 704 has no visibility to the payload of the client traffic. As such, the pass through device does not perform any enforcement at the access layer. This type of enforcement can include, for example, Access Control Lists (ACLs), Quality of Service (QoS), and other filtering policies based on contents other than MAC address. In certain examples, any such filtering policies can be performed at a MACsec compatible device, such as MACsec switch 702. As noted above, this type of access control can be implemented by the pass through switch 704 when other frames are received, for example, frames not associated with Ethertypes that are associated with a pass through list.

The communication network 710 can use wired communications, wireless communications, or combinations thereof. Further, the communication network 710 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 710 can be in the form of a direct network link between devices (e.g., MACsec switches, pass through switches, other switches, routers, etc.). Various communications structures and infrastructure can be utilized to implement the communication network(s).

By way of example, the MACsec client device 706, regular client devices 708, pass through switches, MACsec switches, etc. communicate with each other and other components with access to the communication network 710 via a communication protocol or multiple protocols. A protocol can be a set of rules that defines how nodes of the communication network 710 interact with other nodes. Further, communications between network nodes can be implemented by exchanging discrete packets of data or sending messages. Packets can include header information associated with a protocol (e.g., information on the location of the network node(s) to contact) as well as payload information.

Figure 8:
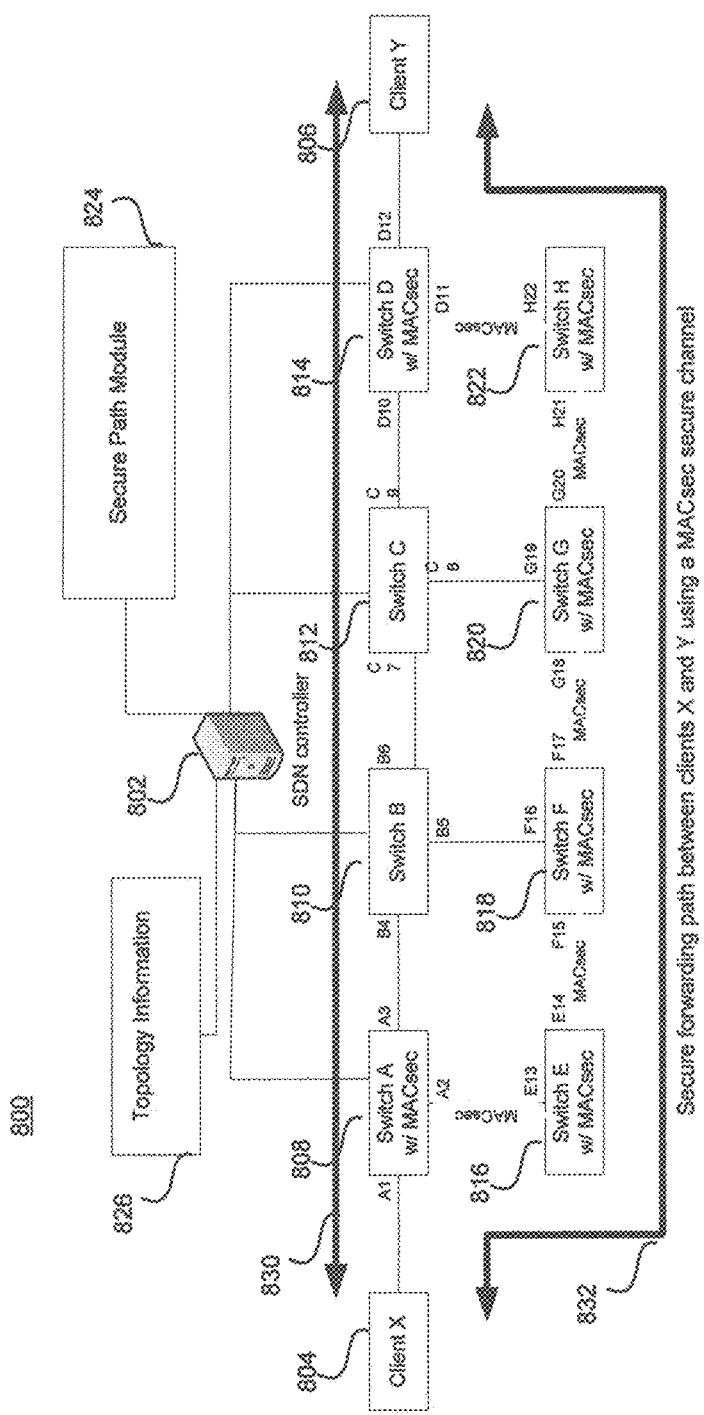
FIG. 8 depicts an example system environment with a secure path and an unsecure path determined, according to one or more examples of the present disclosure.

FIG. 8 depicts a diagram illustrating an example of a system environment 800 according to the present disclosure. The devices in FIG. 8 depict a specific implementation wherein network devices 108, 110, 112, 114, 116, 118, 120 and 122 are implemented as switches 808, 810, 812, 814, 816, 818, 820 and 822, respectively, with some of the switches, as shown, have a security capability, namely MACsec. In the example discussed in FIG. 8, client X 804 has a set of data to transfer to client Y 806, where a portion of the data is to be transferred securely, and the remaining portion of the data is to be transferred normally.

In a typical, or normal, forwarding path, where client X 804, as the source device wants to forward the other portion of the data (and not the portion of the set of data to be sent securely) to client Y 806, as the destination device, controller 804 may determine a path including client X 804→switch A 808→switch B 810→switch C 812→switch D 814→client Y 806. This path is indicated by arrow 830.

As the controller 802 has knowledge about the topology of the system environment 800, as discussed above, controller 802 may determine a secure path through network devices that have a security capability utilizing the secure path module 824 and topology information 826. The arrow 832 identifies the determined secure path as follows: client X 804→switch A 808→switch E 816→switch F 818→switch G 820→switch H 822→switch D 814→client Y 806, where the switches have the security capability, namely MACsec. As can be seen in FIG. 8, the secure path provides MACsec security between each of the switches thereby providing the secure path.

As discussed herein, in a system environment with limited MACsec-capable devices/paths, setting up a secure path between devices for a small transaction may result in all traffic between those hosts to take this secure path. Once complete, the traffic will be redirected to take the normal path. This results in two problems: 1) Other traffic sent between these two devices are temporarily interrupted while their traffic is redirected through the MACsec-enabled paths, 2) All of their traffic is sent across the MACsec-enabled paths which may result in over subscription, depending on the current utilization of those MACsec links.

Using the advanced filtering capabilities mentioned herein, OpenFlow could be used to direct only the specified traffic between two devices to take the secure path. This will result in no disruption of existing traffic flows between both clients and will result in only the required traffic taking the secure path. Thus, a dynamic rule may be generated and sent to the network devices in the path to forward the flow including portion of the set of data to be sent securely through the secure path and to forward the remaining portion of the set of data via the different, non-secure path. Once the flow has been forwarded, the dynamic rule may be complete. The portion of the set of data to be sent securely may be identified based on, for example, an egress port of the client device X 804, based on layer 2 header information, layer 3 header information, layer 4 header information, destination TCP port, destination IP, source IP, destination UDP port, application awareness information including information outside the packet header, etc.

Figure 9:
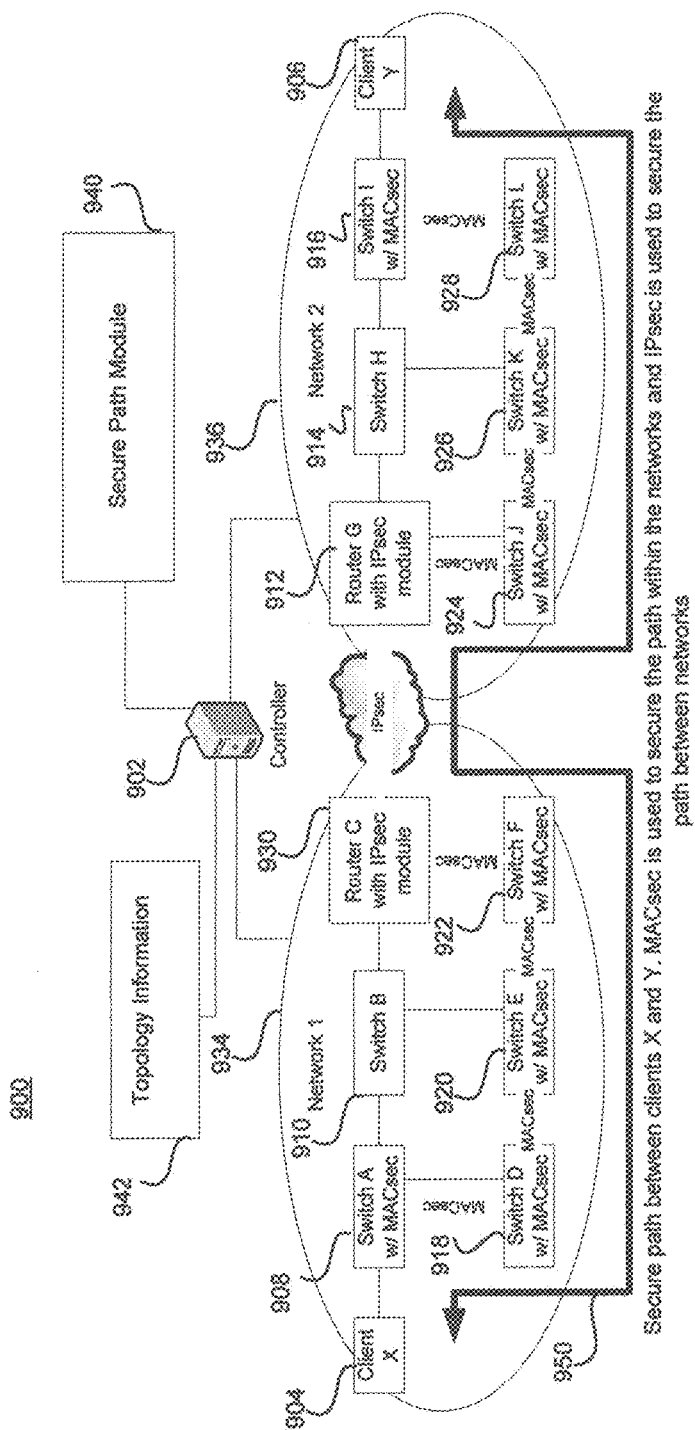
FIG. 9 depicts a diagram illustrating an example of a system environment 900 with a secure path between two networks, according to the present disclosure.

FIG. 9 depicts a diagram illustrating an example of a system environment 900 according to the present disclosure. System environment 900 includes controller 902, client device X 904 as the source device, client device Y 906 as the destination device, router 930 and switches 908, 910, 918, 920 and 922, within network 1 934, and router 912 and switches 914, 916, 924, 926 and 928, within network 2 936. Those devices within system environment 900 having a security capability are indicated. For example, routers 930 and 912 have a security capability, namely IPsec. Switches 908, 918, 920, 922, 916, 924, 924 and 924 have a security capability, namely MACsec. In the example discussed in FIG. 9, client X 904 has data to transfer to client Y 906 where client X 904 is in a different network than client Y906.

As the controller 902 has knowledge about the topology of the system environment 900, as discussed above, controller 902 may determine a secure path through network devices that have a security capability utilizing the secure path module 940 and topology information 942. The controller determines the secure path through switches with MACsec in network 1, namely switches 908, 918, 920, and 922. The controller determines that the path between the source device and the destination device traverse a network boundary. The controller determines that IPsec may be utilized in order to provide a secure path through the network boundary. Thus, the controller may, if needed, instruct the routers 930, 912 to establish an IPsec tunnel between them in order to route the data between the two networks 934, 936. In network 2 936, the controller determines the secure path through switches with MACsec in network 2, namely switches 924, 926, 928, and 916. The arrow 950 identifies the determined secure path.

IPsec may be established either between 2 client devices or between two routers. Generally the destination IP address may be used to route traffic into the encapsulation tunnel. When a packet is encapsulated within an IPsec tunnel, the original IP header is encrypted. In order to make decisions about the QoS that a packet requires the application sending/receiving the packet needs to be known. Each router within the network needs to look at the IP packet header and use the sparse information there to determine if the packet contains VoIP, FTP, or some other application data, and set the QoS level that is appropriate. With IPsec that information is hidden from the routers between the end points.

However, the controller 902 knows the QoS of the flow as well as being able to determine the security requirements. This allows the controller to create a secure path between hosts using only MACsec encrypted links or using IPsec when necessary. If the MACsec links are over-subscribed then the controller can decide to make use of IPsec tunnels between segments of the network and thereby reduce the load on the MACsec links. The controller may also decide to use IPsec if MACsec and MACsec pass-through device are not available. The QoS of the packets within the IPsec encapsulated links can also be maintained as the controller has seen the un-encapsulated IP header and knows the appropriate QoS setting that should be applied to that flow. The IPsec flow can be identified using its IPsec header fields in order for non-IPsec devices to identify this traffic and apply the appropriate QoS setting for this traffic. The same can be applied for MACsec pass-through devices.

Using MACsec secure links also allows the administrator to apply and enforce application aware QoS rules at each MACsec hop. Application awareness typically involves monitoring the packet headers as well as application payloads. If IPsec or MACsec pass-through is used in certain segments of the network, the SDN controller can setup dynamic rules for that particular traffic flow on intermediary devices. This allows each network device the ability to apply QoS at every hop.

Figure 10:
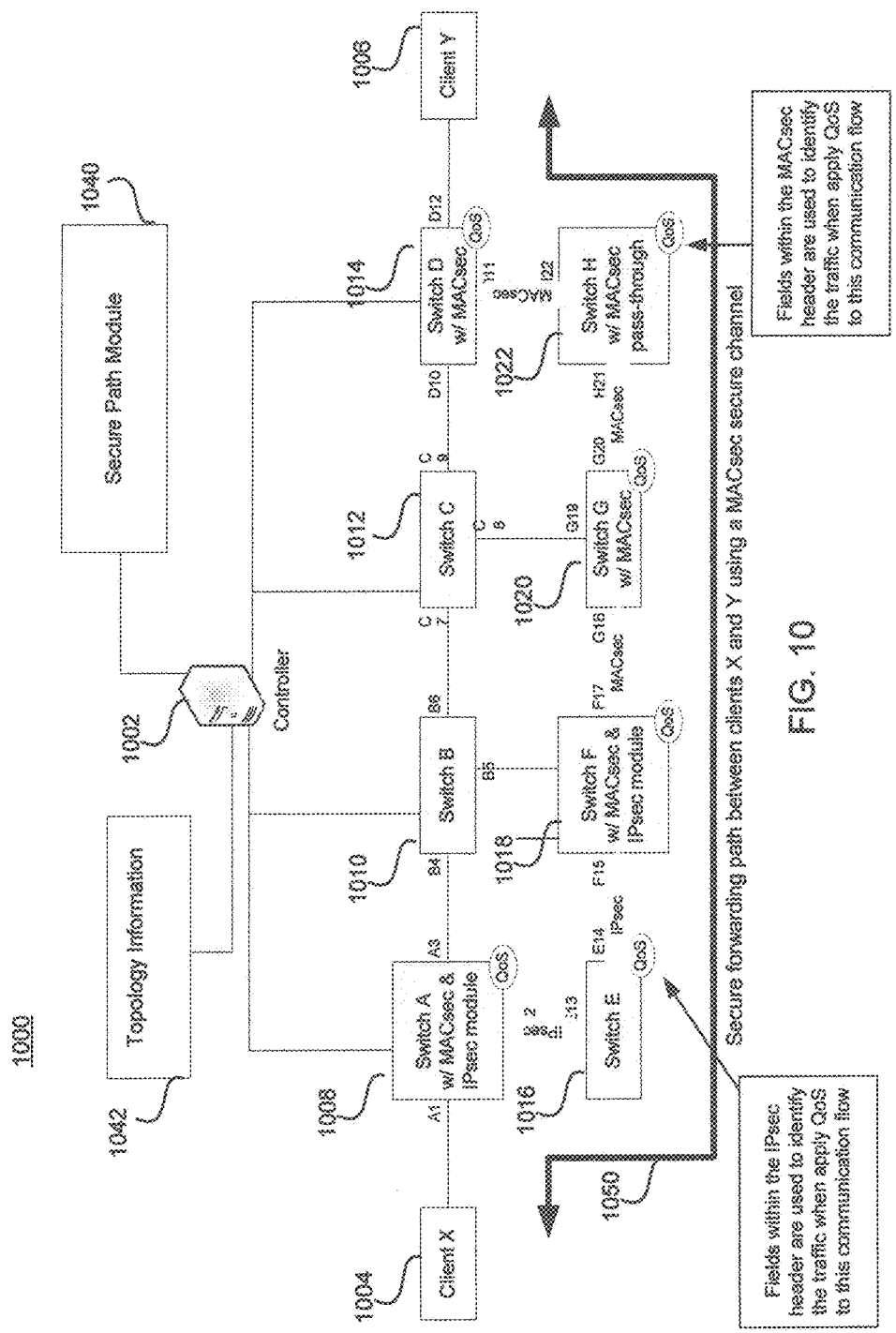
FIG. 10 depicts a diagram illustrating an example of a system environment 1000 with a secure path applying QoS, according to the present disclosure.

FIG. 10 depicts a diagram illustrating an example of a system environment 1000 according to the present disclosure. The devices in FIG. 10 depict a specific implementation wherein network devices 108, 110, 112, 114, 116, 118, 120 and 122 in FIG. 1 are implemented as switches 1008, 1010, 1012, 1014, 1016, 1018, 1020 and 1022, respectively, with some of the switches, as shown, have a security capability as shown in the figure.

As the controller 1002 has knowledge about the topology of the system environment 1000, as discussed above, controller 1002 may determine a secure path through network devices that have a security capability. The arrow 1050 depicted in FIG. 10 identifies the determined secure path as follows: client X 1004→switch A 1008→switch E 1016→switch F 1018→switch G 1020→switch H 1022→switch D 1014→client Y 1006. As can be seen in FIG. 10, the secure path is a combination of MACsec and IPsec. For example, switches 1008 and 1018 have a security capability, namely IPSec, where switch 1016 has no security capability. By enabling IPsec between switches 108 and 1018, data may be securely transferred through switch 1016. In another example, switch 1022 has a security capability, namely MACsec pass through. Thus, switches 1020 and 1014 may establish a secure channel between them where switch 1022 operates as a pass through passing the secure data through switch 1022 to switch 1014.

In addition to the secure path being determined, the controller 1002 may further apply a dynamic rule, namely applying quality of service (QoS) settings, for a particular flow including the data to be forwarded, at each network device hop in the secure path. The controller 1002 may set an appropriate QoS, for the traffic flow that includes the data to be forwarded, along the secure path throughout the network, including the network devices that do not have visibility to the traffic headers, for example switches 1016 and 1022. Switch 1016 does not see the unencrypted packets based on the IPsec protocol applied at the point in the secure path. In addition, switch 1022 does not see the unencrypted data as it operates as a MACsec pass through device. Once the flow has been forwarded, the dynamic rule may be complete.

It may be appreciated that combinations of the examples discussed herein may be employed. Thus, in a system environment, a controller may perform one or more of: 1) determine a secure path for data; 2) determine a secure path for a portion of data and determine a different, unsecure path for the other portion of data; 3) determine a secure path within a single network or between multiple networks; and 4) apply QoS settings for a secure path. For example, the controller may identify a secure path between a plurality of networks, and employ QoS at each hop in the secure path. Alternatively, the controller may identify a secure path between a plurality of network devices within a network and employ QoS at each hop in the secure path. Alternatively, the controller may identify a secure path between a plurality of networks, and employ QoS at each hop in the secure path.

What is claimed:

1. A method, performed at a controller, comprising:
   receiving, at the controller, a request to forward data securely;
   determining, based on the received request, a secure path between a source device and a destination device, via a plurality of network devices, based on a security capability of each of the plurality of network devices, and wherein:
   the plurality of network devices are part of at least one network including a plurality of other network devices not included in the secure path,
   a plurality of the network devices is selected for the secure path based on having a media access security (MACsec) capability,
   at least one of the network devices is selected from the network devices having the MACsec capability for the secure path based on having a MACsec pass-through capability, and
   the MACsec pass-through capability comprises to parse a frame received from the MACsec capability to determine whether the frame is to be passed through the plurality of the network devices based on a predetermined Ethertype of the frame; and
   enabling forwarding of data between the source device and the destination device, via the plurality of network devices, based on the determined secure path.

2. The method of claim 1, wherein enabling the forwarding of data between the source device and the destination device includes:
   determining if the security capability of each of the plurality of network devices is enabled; and
   enabling the security capability of each of those plurality of network devices where it determined that the security capability is not enabled, wherein the security capability is at least one of media access control security (MACsec), MACsec pass-through, and internet protocol security (IPsec).

3. The method of claim 1, wherein the secure path is through a plurality of networks including the at least one network.

4. The method of claim 1:
   wherein the data enabled to be forwarded between the source device and the destination device is a portion of a set of data; and
   wherein a remaining portion of the set of data is forwarded via a different, non-secure path between the source device and the destination device using at least one of the other network devices.

5. The method of claim 4, wherein the data to be forwarded between the source device and the destination device via the secure path is identified based on header information of the data.

6. The method of claim 1, further comprising:
   establishing a quality of service (QoS) setting at each of the plurality of network devices in the secure path for the enabled forwarding of data between the source device and the destination device.

7. The method of claim 1, wherein another one of the network devices is selected for the secure path based on having an IPsec capability after the network controller determines that the secure path cannot include each of the network devices having the MACsec capability.

8. A non-transitory machine-readable medium storing instructions executable by a network controller to cause the network controller to:
   determine a secure path between a source device and a destination device, via a plurality of network devices, based on a security capability of each of the plurality of network devices, and wherein:
   the plurality of network devices are part of at least one network including a plurality of other network devices not included in the secure path,
   a plurality of the network devices is selected for the secure path based on having a media access security (MACsec) capability,
   at least one of the network devices is selected from the network devices having the MACsec capability for the secure path based on having a MACsec pass-through capability, and
   the MACsec pass-through capability comprises to parse a frame received from the MACsec capability to determine whether the frame is to be passed through the plurality of the network devices based on a predetermined Ethertype of the frame; and
   enable forwarding of data between the source device and the destination device, via the plurality of network devices, based on the determined secure path.

9. The medium of claim 8, wherein the network controller is further to:
   ensure the security capability of each of the plurality of network devices is enabled, the security capability including at least one of media access control security (MACsec), MACsec pass-through, and internet protocol security (IPsec).

10. The medium of claim 8, wherein the network controller is further to:
   determine the data is a portion of a set of data to be forwarded; and
   generate a dynamic rule for the plurality of network devices to forward the portion of the set of data via the secure path.

11. The medium of claim 10, wherein the network controller is further to:
   forward a remaining portion of the set of data via a different, non-secure path between the source device and the destination device using at least one of the other network devices.

12. The medium of claim 8, wherein the network controller is further to:
   establish a quality of service (QoS) setting at each of the plurality of network devices in the secure path for the enabled forwarding of data between the source device and the destination device.

13. The medium of claim 8, wherein the network controller is further to determine the secure path based on whether a link between two of the plurality of other network devices is over-subscribed.

14. The medium of claim 8, wherein the secure path is through a plurality of networks, including the at least one network.

15. The medium of claim 8, wherein the network controller is further to: select another one of the devices in the secure path based on having an IPsec capability after the network controller determines that the secure path cannot include each of the network devices having the MACsec capability or a MACsec pass-through capability.

16. A network controller, comprising:
   a memory access controller to manage a memory storing topology information of a network, the topology information including a plurality of devices in the network and device information, each of the plurality of devices having associated therewith device information;
   a secure path module to:
      determine a secure path between a source device and a destination device, via at least two of the plurality of network devices, based on a security capability of the at least two of network devices, and wherein,
         the network includes a plurality of other network devices not included in the secure path,
         a plurality of the network devices is selected for the secure path based on having a media access security (MACsec) capability,
         a plurality of the network devices is selected from the network devices having the MACsec capability for the secure path based on having a MACsec pass-through capability, and
         the MACsec pass-through capability comprises to parse a frame received from the MACsec capability to determine whether the frame is to be passed through the plurality of the network devices based on a predetermined Ethertype of the frame; and
      to enable forwarding of data between the source device and the destination device, via the at least two of network devices, based on the secure path determined by a determination module; and
   a processor to execute the determination module and a forwarding module, wherein the network controller is outside of the secure path.

17. The network controller of claim 16, wherein the secure path module is further to establish a quality of service (QoS) setting at each of the plurality of network devices in the secure path between the source device and the destination device.

18. The network controller of claim 16, wherein at least one of the network devices is selected for the secure path based on having an IPsec capability.

* * * * *